(12) United States Patent
Stolz et al.

(10) Patent No.: US 6,902,347 B2
(45) Date of Patent: Jun. 7, 2005

(54) DEVICE FOR CONNECTING TWO COMPONENTS

(75) Inventors: Gerhard Stolz, Ingersheim (DE); Frank Stahl, Pleidelsheim (DE)

(73) Assignee: KOMET Praezisionswerkzeuge Robert Breuning GmbH, Besigheim (DE)

(*) Notice: Subject to any disclaimer, the term of this patent is extended or adjusted under 35 U.S.C. 154(b) by 18 days.

(21) Appl. No.: 10/451,566

(22) PCT Filed: Dec. 19, 2001

(86) PCT No.: PCT/EP01/15084
§ 371 (c)(1),
(2), (4) Date: Jun. 20, 2003

(87) PCT Pub. No.: WO02/051572
PCT Pub. Date: Jul. 4, 2002

(65) Prior Publication Data
US 2004/0047680 A1 Mar. 11, 2004

(30) Foreign Application Priority Data
Dec. 22, 2000 (DE) .......................... 100 64 705

(51) Int. Cl.⁷ ................................. F16B 7/04
(52) U.S. Cl. .................. 403/374.3; 403/374.1; 403/374.2; 403/362; 279/83; 408/238; 408/239 R
(58) Field of Search ................. 403/202, 378, 403/379.1, 355, 361, 362, 379.3, 379.4, 379.5, 374.1, 374.2, 374.3, 408.1; 279/83; 409/232, 234; 408/239 R, 238, 239 A

(56) References Cited

U.S. PATENT DOCUMENTS

| 4,755,077 A | 7/1988 | Eckle |
| 4,895,474 A | 1/1990 | Eckle |
| 4,976,574 A | 12/1990 | Muendlein et al. |
| 4,979,845 A | * 12/1990 | Scheer et al. ............ 403/379.4 |
| 5,137,401 A | 8/1992 | Muendlein et al. |

FOREIGN PATENT DOCUMENTS

| DE | 34 06 498 | * 10/1984 | ............ B23Q/3/12 |
| DE | 37 08 746 | 6/1988 | |
| DE | 37 39 710 | 1/1989 | |
| EP | 0 547 049 | 6/1993 | |
| GB | 2 094 191 | 9/1982 | |

* cited by examiner

*Primary Examiner*—Daniel P. Stodola
*Assistant Examiner*—Michael P. Ferguson
(74) *Attorney, Agent, or Firm*—Flynn, Thiel, Boutell & Tanis, P.C.

(57) ABSTRACT

The tensioning mechanism (18) comprises a clamp bolt (28), arranged in a displaceable manner in a transverse bore (26) in the fitting plug (12) and two diametrically opposed retainers (34, 36) in the second component (14) which engage with an axially facing internal or external cone against a complementary internal or external cone on the clamp bolt (28) and, during tensioning, are tensioned with the same in a wedge fashion. According to the invention, the clamp bolt (28) comprises a frustum-shaped external cone (40), the base diameter of which is smaller than the diameter of the guide surface (62) thereof in the transverse bore (26).

23 Claims, 3 Drawing Sheets

DEVICE FOR CONNECTING TWO COMPONENTS

BACKGROUND OF THE INVENTION

The invention relates to a device for connecting two components, in particular two tool parts, comprising a cylindrical fitting plug arranged on the first component, and comprising a radially projecting annular surface surrounding the fitting plug at its root, comprising a cylindrical fitting bore arranged in the second component for receiving the fitting plug, and comprising an annular surface surrounding the fitting bore at its edge, comprising a clamp bolt, which is movably guided with a cylindrical guide surface in a transverse bore in the fitting plug, and has on its axially facing ends an internal or external cone concentric with respect to said guide surface, and the length of which clamp bolt is smaller than the diameter of the fitting plug in the area of the transverse bore, and comprising two retainers, which are inserted into radial bores, which are diametrically opposed in the area of the fitting bore and are preferably provided with an internal thread, and which retainers have an external or internal cone extending toward the inside of the fitting bore and being complementary with respect to the internal or external cone of the clamp bolt, and which retainers can be tensioned wedge-like with the clamp bolt during the tensioning operation, whereby the internal and external cones, which are complementary with respect to one another, have in pairs an axial shift causing during the tensioning operation the pulling of the fitting plug into the fitting bore and a mutual pressing of the two annular surfaces against one another.

A clamp bolt having an internal cone at one end and an external cone at the other end is known in a device of this type (EP-B 0547049). The one retainer is designed as a stop screw fixed in the second component, which stop screw has an internal cone cooperating with the external cone of the clamp bolt, whereas the other retainer is designed as a motion screw, which has an external cone engaging the internal cone of the clamp bolt. When during screwing in of the motion screw a bearing occurs, then the forces introduced in this manner occur initially on the side of the motion screw. The clamp bolt is thereby first pressed on the side of the motion screw against the base of the transverse bore, which faces the end of the fitting plug, so that the fitting plug is pulled into the fitting bore. This occurs directly thereafter also during a moving of the clamp bolt external cone onto the internal cone of the oppositely lying stop screw. As soon as a certain tensioning action has occurred, the transfer of the radial forces into an axial component pressing the annular surfaces of the first and second components against one another takes place. However, a portion of the torque introduced through the motion screw is utilized to overcome the friction of the clamp bolt in the transverse bore so that the annular surfaces on the side of the motion screw are pressed against one another with a greater radial force than on the side of the stop screw. In this manner one obtains on the side of the motion screw a higher rigidity than on the side of the stop screw. A tilting moment is applied during the tensioning operation onto the transverse bolt, which tilting moment in the case of a shorter guide surface results in an edge pressing than in the case of longer guide surfaces. Thus the longer the guide, the less is it possible for the clamp bolt to tilt and the smaller are the friction forces to be overcome.

BRIEF SUMMARY OF THE INVENTION

Starting out from this the basic purpose of the invention is to improve the known connecting device of the above-disclosed type in such a manner that the torque produced during the tensioning operation is transferred better within the connecting device and, viewed over the circumference, more evenly into the planar surface tensioning.

The inventive solution is mainly based on the knowledge that the complementary external and internal cones, which face one another, are in the bearing area not pressed against one another over their entire length but merely over a relatively short distance. In order to be able to guide the fitting plug of the first component into the fitting bore of the second component, it is necessary that the clamp bolt including the external cone is slightly shorter than the diameter of the fitting plug in the area of the transverse bore. The supporting length of the clamp bolt within the transverse bore is on the other hand optimized according to the invention.

This can be achieved by mainly shortening the external cone of the clamp bolt. In order to make this possible, it is suggested according to a first solution modification of the invention that the clamp bolt has at least one frustum-shaped external cone, which projects beyond the axially facing end, and the base diameter of which is smaller than the diameter of the guide surface. The base diameter of the external cone is advantageously at a maximum 85%, preferably 60 to 75%, of the diameter of the guide surface. With this measure it is achieved that also the height of the frustum-shaped external cone can be chosen to be at a maximum 40%, preferably 10 to 30%, of the diameter of the guide surface so that altogether a shortened external cone and a correspondingly longer guide surface is obtained.

According to an alternative or advantageous embodiment of the invention, the clamp bolt has at least one frustum-shaped internal cone, the base diameter of which is at least 65%, advantageously 70 to 90%, of the guide diameter. In addition, it is advantageous when the height of the frustum-shaped internal cone is at a maximum 30%, preferably 10 to 25%, of the guide diameter.

Also on the side of the retainers there exists the possibility of a shortening of the external and internal cones. Thus, it is suggested according to a preferred embodiment of the invention that one of the two retainers, which is preferably designed as a stop screw, has a frustum-shaped internal cone, the height of which is at a maximum 30%, preferably 10 to 25%, of its thread diameter. It is in this case furthermore possible that the base diameter of the internal cone is in the respective retaining screw at least 70%, preferably 75 to 90%, of its external or thread diameter.

On the other hand, one of the two retainers, which is preferably designed as a motion screw, is provided with a frustum-shaped external cone, the height of which is at a maximum 40%, preferably 10 to 30%, of its external or thread diameter, whereas the frustum diameter is at least 40%, preferably 50 to 60%, of the external or thread diameter. The frustum diameter is thereby understood to be the smallest diameter and the base diameter the largest diameter of a frustum of a cone.

A further alternative or advantageous embodiment of the invention provides that the clamp bolt has at least one frustum-shaped external cone projecting beyond the axially facing end, the frustum diameter of which external cone corresponds at least to 0.4 times the associated base diameter. The frustum diameter of the external cone formed on the clamp bolt corresponds advantageously to 0.6 to 0.9 times the associated base diameter.

A further preferred embodiment of the invention provides that the clamp bolt has at least one frustum-shaped internal cone arranged on the axially facing end, the frustum diameter of which internal cone corresponds at least to 0.5 times, preferably 0.6 to 0.8 times the associated base diameter.

On the other hand it is suggested according to the invention that one of the retainers preferably designed as a stop screw has a frustum-shaped internal cone, the frustum diameter of which corresponds at least to 0.6 times, preferably 0.75 to 0.95 times the associated base diameter. It is furthermore advantageous when one of the retainers preferably designed as a motion screw has a frustum-shaped external cone, the frustum diameter of which corresponds to 0.4 times, preferably 0.5 to 0.8 times the associated base diameter.

It is achieved with the above measures that the guide surface, with which the clamp bolt rests frictionally against the inner surface of the transverse bore, can be optimized in its length. In this manner the friction forces to be overcome are minimized and the surface bearing pressure is improved in the area of the annular surfaces, viewed over the circumference.

In order to improve this further, it is suggested according to an alternative and advantageous embodiment of the invention that one of the retainers is designed as a stop bolt fixed on the second component and the other retainer as a motion screw operable during the tensioning operation, and that the internal and external cones, which are complementary to one another, have on the side of the stop bolt a smaller cone angle than on the side of the motion screw. According to a preferred embodiment of the invention, the cone angles are on the side of the stop bolt between 40 and 80°, whereas they are on the side of the motion screw 70 to 120°. The engaging internal and external cones act during the tensioning operation as a type of a wedge, through which the radial movement of the motion screw and of the clamp bolt are partly transferred into the axial planar surface tensioning. Due to the inventive varying cone angles on the side of the motion screw and of the stop bolt, varying axial components result percentally: with the smaller cone angle on the side of the stop bolt one obtains an enlarged axial component and thus a compensation of the friction losses of the clamp bolt within the transverse bore.

The internal cones end advantageously on the frustum side in an enlarged bore. It is possible with this measure to utilize during the tensioning operation the full height of the internal cone without any danger of jamming.

In order to additionally improve the friction relationships in the threads, it is suggested according to a further preferred or alternative embodiment of the invention that at least one of the internal threads in the second component is followed toward the fitting bore by a threadless guide and support portion for the respective retainer designed as a screw. With this a precise guiding and supporting of the respective screw is guaranteed mainly in the area of the internal and external cones engaging one another in pairs. Furthermore, the guide length of the respective screw can be enlarged with this, with the result that the tendency for the screw to tilt and thus the friction is reduced, with the result that even when using a normal thread higher torques can be transferred into a planar surface tensioning.

A further preferred or alternative embodiment of the invention provides that one of the retainers is designed as a head bolt, which has an internal or external cone on its head side, and which can be inserted from the inside of the fitting bore into the associated radial bore. This measure achieves besides a secure seat of the retainer an improved force transfer at the transition points of the tensioning elements without the danger of swaging of material. It is particularly advantageous in this connection when the head bolt is inserted with its shaft, which is designed thread free, and/or with its head part into the radial bore in a press fit, which radial bore is preferably designed as a stepped bore. However, it is basically here also possible that the clamp bolt with its shaft carrying an external thread is screwed into the radial bore designed as a taphole. It is thereby important that the head bolt with its at least partly cylindrical and/or conical head part is force-lockingly supported on a wall portion of the radial bore, which wall portion is formed complementarily to the head part.

BRIEF DESCRIPTION OF THE DRAWINGS

The invention will be discussed in greater detail hereinafter in connection with the exemplary embodiments illustrated in the drawings, in which.

DETAILED DESCRIPTION OF THE INVENTION

Figure 1:
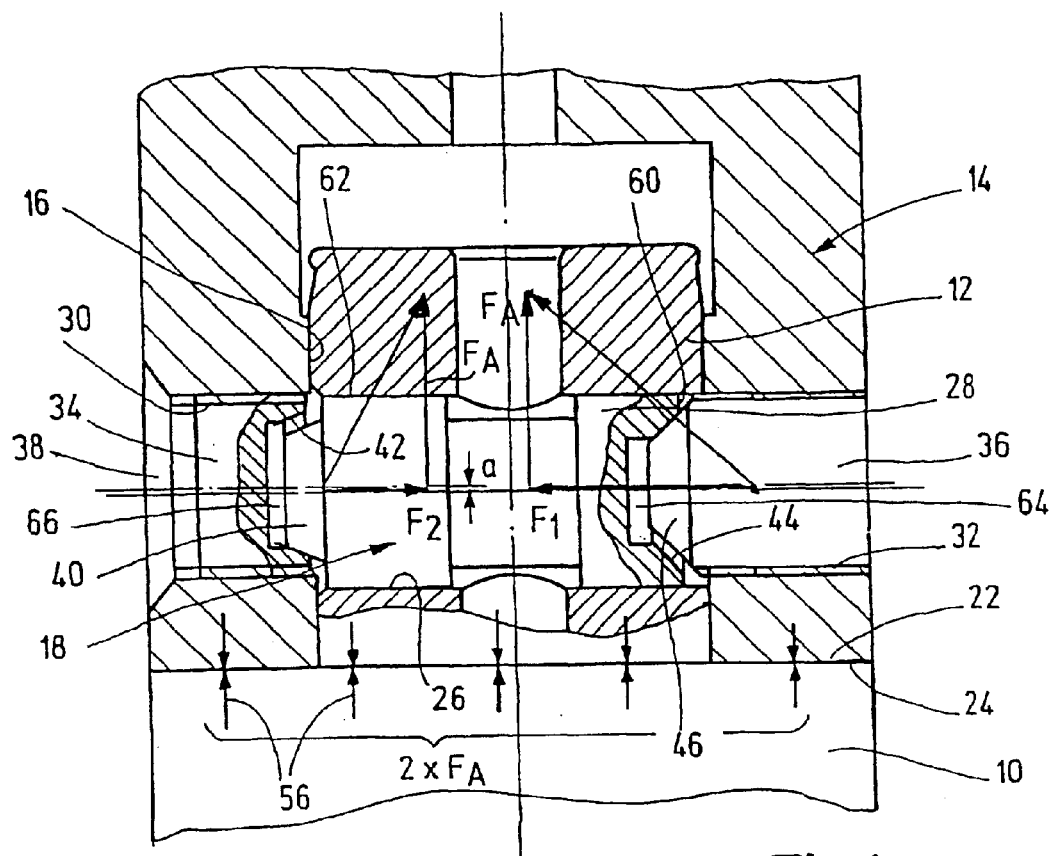
FIG. 1 is a longitudinal cross-sectional view of a tool coupling with a planar surface tensioning.

The connecting devices illustrated in the drawings are used to releasably couple components. "Components" are above and hereinafter understood to be primarily tool components, which house either a dowel or a fitting bore, thus in particular tool heads, tool shafts, adapter parts or intermediate elements, such as extension and reducing components, adjusting heads, spindle-adapter flanges and, if necessary, a tool spindle.

The connecting device consists essentially of a fitting plug 12 projecting axially beyond a first component 10, a fitting bore 16 arranged in a second component 14, and a tensioning mechanism 18 to pull the fitting plug 12 into the fitting bore 16 and to create a planar surface tensioning between an annular surface 22 on the first component 10, which annular surface 22 surrounds the fitting plug 12, and an annular surface 24 on the second component 14, in which annular surface is provided the fitting bore 16.

Figure 2:
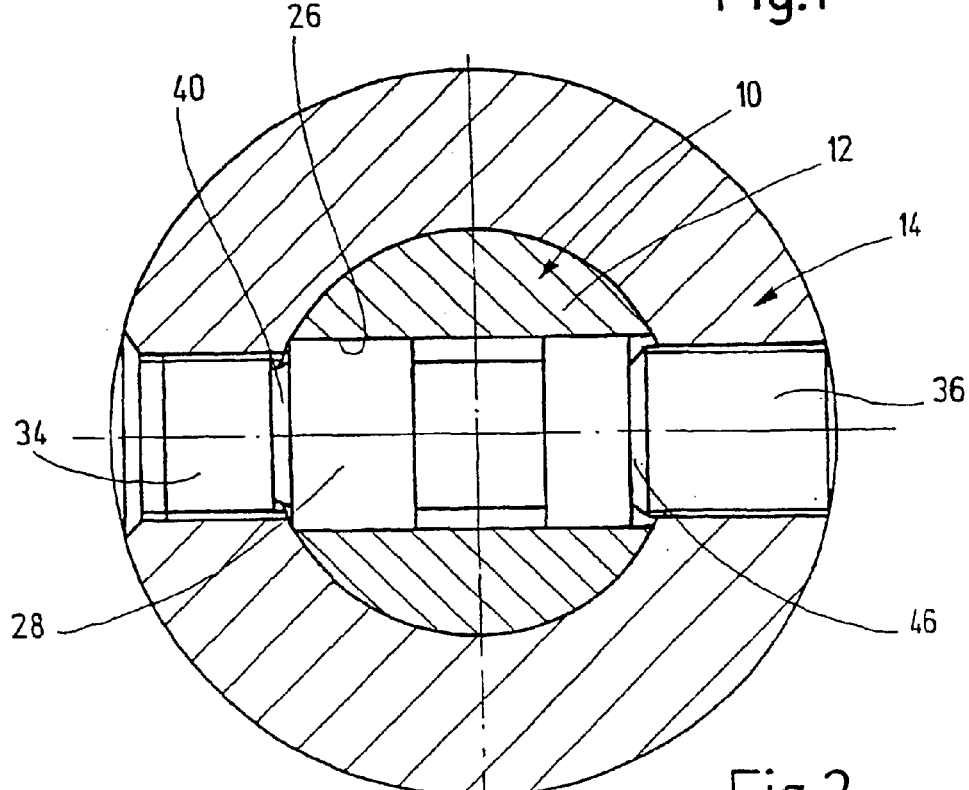
FIG. 2 is a cross-sectional view of the tool coupling according to FIG. 1.

The tensioning mechanism 18 houses a clamp bolt 28, which is movably arranged in a transverse bore 26 through the fitting pin 12, and two diametrically opposed retainers 34, 36, which are inserted into radial bores 30, 32 in the second component. The retainer 34 according to FIGS. 1 and 2 is thereby designed as a stop screw fixed with its flat head 38 on the second component 14, whereas the retainer 36 forms a motion or tensioning screw. The clamp bolt 28 engages with its external cone 40 an internal cone 42 of the adjacent stop screw 34, and has an internal cone 44 at its end opposite the external cone 40 to receive an external cone 46 formed on the motion screw 36.

To create a connection between the two components 10, 14, the fitting plug 12 is, with the motion screw 36 being unscrewed, initially loosely guided into the fitting bore 22 of the second component 16 until it engages the annular surfaces 22, 24. During the subsequent screwing of the motion screw 36 into the internal thread 32, an engagement initially takes place between the motion screw 36 and the clamp bolt 28 in the area of the opposing cone surfaces 44, 46. During the further course of the tensioning operation, the clamp bolt 28 is moved with its external cone 40 into the internal cone 42 until it engages the stop screw 34. At this stage, the actual tensioning operation starts, during which the tensioning forces $F_1$, $F_2$ introduced through the retaining screws 36, 34 due to the axial shift, are transferred through the conical bearing surfaces into axial forces $F_A$ pulling the fitting plug 12 into the fitting bore 20. The axial forces $F_A$ causes a planar surface tensioning on the annular surfaces 22, 24 of the first and the second components 10, 14, which planar surface tensioning is indicated by the arrows 56. The axial forces $F_A$ are thereby transferred through the clamp bolt 28 in the area of the base 50 of the transverse bore 26, which base faces the end 58 of the fitting plug, onto the fitting plug 12 and thus onto the first component 10. On the other hand, the tensioning forces must in the area of the retaining screws 34, 36 be absorbed by the respective internal thread 30, 32 within the wall of the second component 16.

Figure 3A:
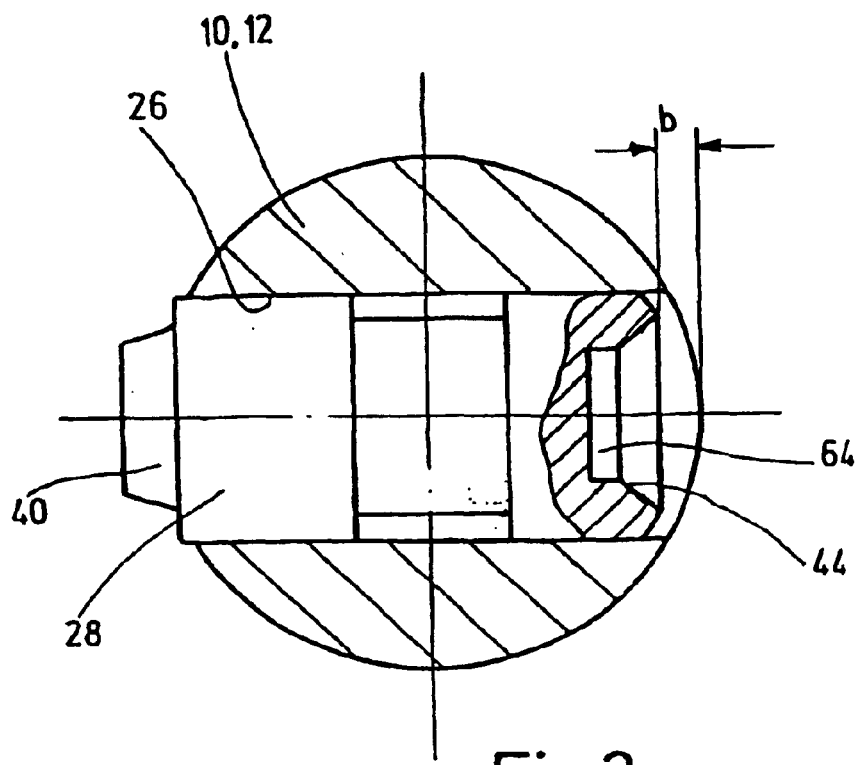
FIGS. 3a and 3b show, respectively, a section of FIG. 1 with the inventive clamp bolt and a clamp bolt according to the known state of the art.
Figure 3B:
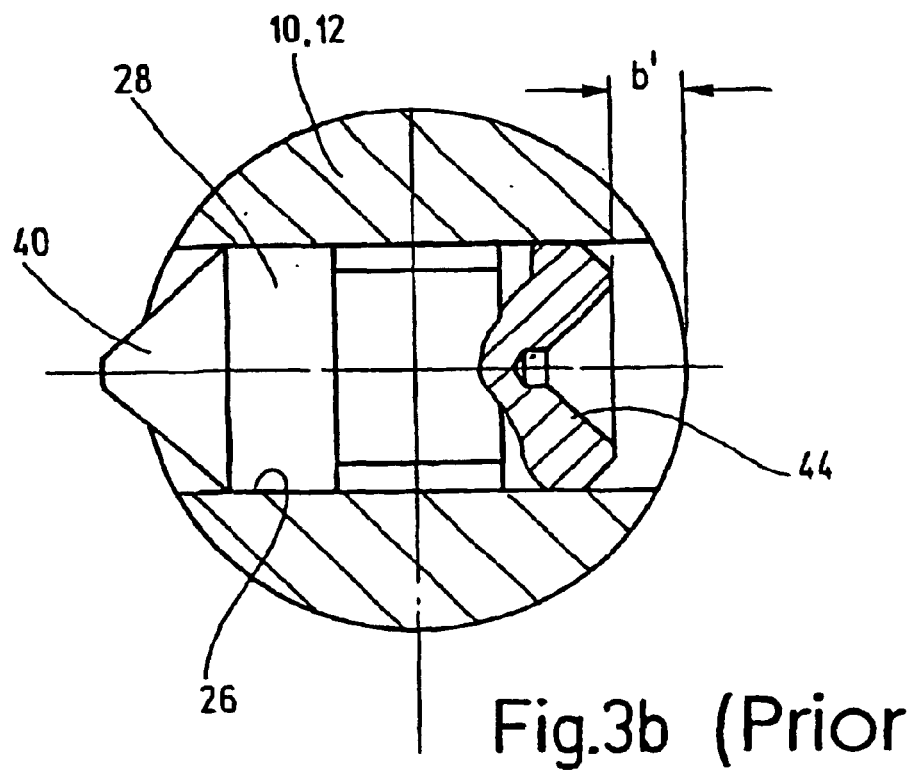

As a comparison between the inventive clamp bolt 28 illustrated in FIG. 3a and the known clamp bolt according to the EP-B 0547049 as the illustration of FIG. 3b shows, there exists a significant difference in the length of the external and internal cones 40, 44. The same is true for the external cone 46 of the motion screw 36 and the internal cone 42 of the stop screw 34. It is achieved with these measures that the length of the guide surface 62 of the clamp bolt 28 can at a given diameter of the fitting plug be enlarged by approximately 20%, with the result that the clamp bolt 28 is supported over a greater length in the transverse bore 26 so that a lesser tendency to tip and a reduction of the friction forces, which must be overcome, is achieved.

The same is true for the motion screw 36, the external cone 46 of which is so short that its shaft is supported over a greater length in the internal thread 32. This effect is expressed in FIGS. 3a and 3b by the dimension b, b', which illustrates the difference in the open space of the tensioning-screw projection and in the tensioned state. The path of movement of the motion screw is in the case of the inventive exemplary embodiment according to FIG. 3a less than half the size than in the known embodiment according to FIG. 3b. This means that the clamp bolt during the tensioning operation must also be moved at a correspondingly shorter path of movement b instead of b'. The shorter path of movement has the result that masses must be moved to a lesser degree with respect to the geometric centerpoint thereof, which mass movement could result in an unbalance. Due to the shorter path of movement, the balance symmetry in the tensioned state can be adjusted more precisely than has heretofore been possible, which is of importance in particular for high tool speeds.

As can be seen particularly in FIGS. 1 and 3, the conical external cone 40 of the clamp bolt 28, which cone projects beyond the axially facing side, has a base diameter which is smaller than the diameter of the guide surface 62. The base diameter of the external cone 40 is in the illustrated exemplary embodiment approximately 70% of the guide diameter, whereas the height of the frustum-shaped external cone is less than 20% of the guide diameter. The relative shortness of the external cone can also be quantified by the ratio between the frustum diameter (smallest diameter) and the base diameter (largest diameter) of a cone. In the case of the external cone 40 of the clamp bolt 28 this ratio is 0.8, whereas it is 0.5 in the case of the external cone 46 of the tensioning screw. Similar values result also for the internal cones 42, 44, which also have a relatively low height.

Similar values result from a measurement of the external cone 46 and the internal cones 42 and 44. The cone sections, in particular the internal cones, are kept as short as it is needed for the carrying length. A recess 64, 66 is provided in axial direction behind the carrying cone area of the internal cones, into which recess can penetrate the external cone during the tensioning operation without contact taking into consideration all occurring measurement fluctuations.

The shortening of the external and internal cones results, on the side of the motion screw 36, in the advantage that there is obtained a greater guide length in the thread area. When up to now only approximately ⅔ to ¾ of the thread length could be utilized, now the entire thread length is available for guiding for this case.

Figure 4:
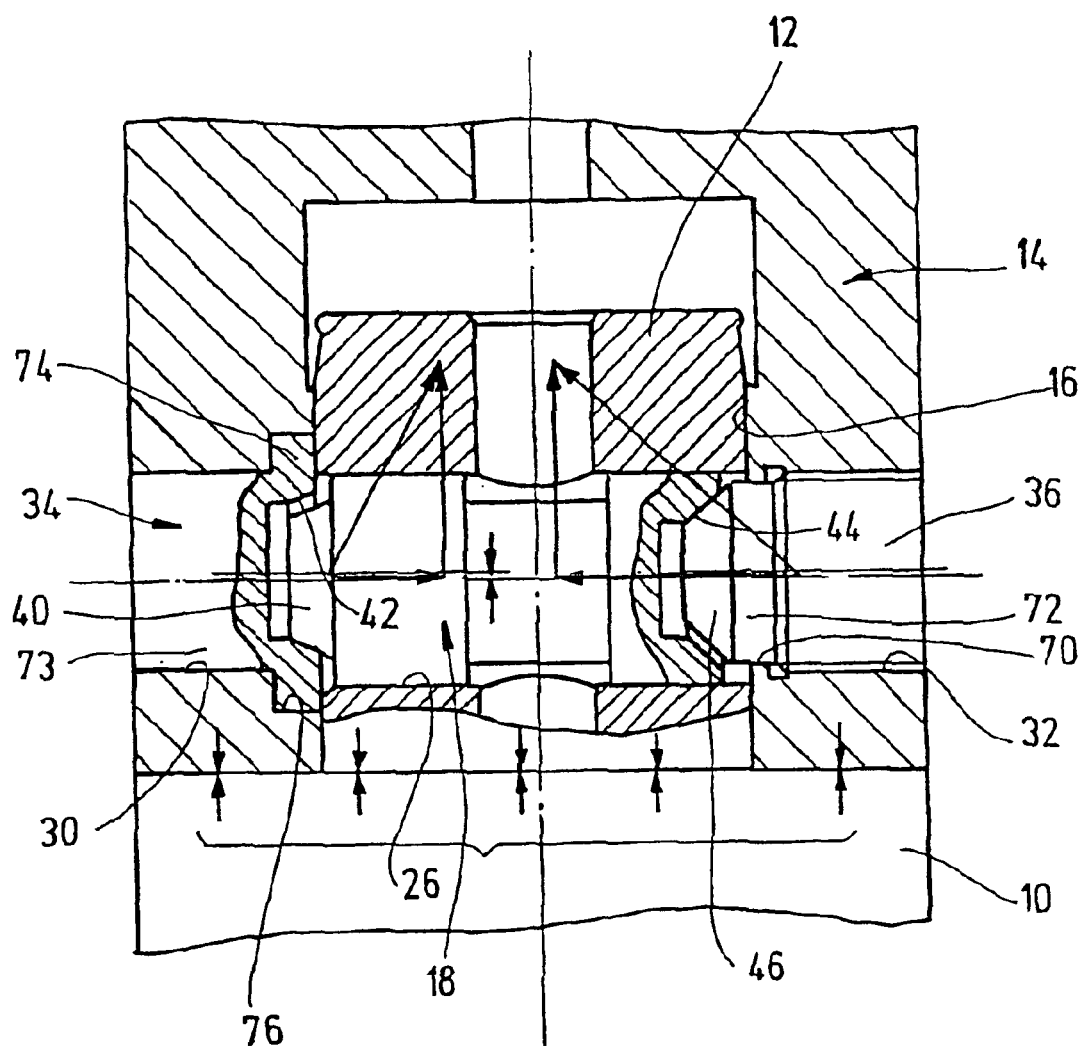
FIG. 4 is a longitudinal cross-sectional view of a tool coupling modified compared to FIG. 1 with a planar surface tensioning.

A further improvement of the guiding characteristics in the area of the motion screw 36 can be achieved when the end of the radial bore 32, which end faces the fitting bore, is designed as a threadless guide bore 70, and the motion screw 36 has a corresponding threadless guide section 72 (compare FIG. 4). The threadless sections assure that the motion screw is guided with a lesser fit clearance in the critical area of the cone-receiving means, and the thread receives primarily a tensioning function in axial direction.

A further characteristic of the invention is that the cone angle (opening angle) of the cones, which are complementary to one another, is larger on the side of the motion screw 36 than on the side of the stop screw 34. This has the result that on the side of the stop screw 34 a greater portion of the tensioning force $F_2$ is converted into the axial component $F_A$ than on the side of the motion screw 36 (tensioning force $F_1$, axial force $F_A$). This measure compensates for the friction losses occurring during the tensioning operation in the area of the transverse bore 26, which friction losses result in a reaction force $F_2$ which is smaller compared with the tensioning force $F_1$, so that the planar surface pressing 56 is comparatively measured.

The exemplary embodiment according to FIG. 4 differs from the exemplary embodiment according to FIG. 1 on the one hand in such a manner that on the side of the motion screw there is guided a threadless section 72 in a threadless part 70 of the radial bore 32. Furthermore, the retainer 34 is in this exemplary embodiment designed as a head bolt, which has an internal cone 42 on its head side, and which is either screwed or pressed, forming a press fit, with its shaft 73 from the inside of the fitting bore 16 into the radial bore 30. The head part 74 of the head bolt 34 has a cylindrical outer surface in the illustrated exemplary embodiment, and is positively supported in a wall portion 76 of the radial bore 30 designed as a step bore, which wall portion is complementarily formed with respect to the cylindrical outer surface.

In summary the following is to be stated: The invention relates to a device for connecting two components 10, 12, for example two tool parts. The first component 10 has thereby a cylindrical fitting plug 12, and an annular surface 22 projecting radially beyond the fitting plug 12, whereas the second component has a cylindrical fitting bore 16 in order to receive the fitting plug 12 and an annular surface 24 surrounding the fitting bore 16. Furthermore, a tensioning mechanism 18 is provided which assures, during the tensioning operation, that the fitting plug 12 is pulled into the fitting bore, and the annular surfaces 22, 24 are thereby pressed against one another. The tensioning mechanism 18 houses a clamp bolt 28 movably arranged in a transverse bore 26 of the fitting plug 12, and two retainers 34, 36, which are diametrically opposed in the second component 14 and which each rest with one face-side internal or external cone against a complementary external or internal cone of the clamp bolt 28, and are during the tensioning operation tensioned thereby in a wedge-like fashion. The clamp bolt 28 has according to the invention a frustum-shaped external cone 40, the base diameter of which is smaller than the diameter of its guide surface 62 in the transverse bore 26.

What is claimed is:

1. A device for connecting first and second components, comprising:
    a cylindrical fitting plug arranged on the first component and comprising a radially projecting annular surface surrounding the fitting plug at its root;
    a cylindrical fitting bore arranged in the second component for receiving the fitting plug, and comprising an annular surface surrounding the fitting bore at its edge;
    a clamp bolt, which is movably guided with a cylindrical guide surface in a transverse bore in the fitting plug, and has on its axially facing ends an internal or external cone concentric with respect to said guide surface, and the length of which clamp bolt is smaller than the diameter of the fitting plug in the area of the transverse bore; and
    two retainers, which are inserted into radial bores which are diametrically opposed in the area of the fitting bore and are provided with an internal thread, and which retainers have an external or internal cone extending toward the inside of the fitting bore and being complementary with respect to the internal or external cone of the clamp bolt, and which retainers can be tensioned wedge-like with the clamp bolt during the tensioning operation,
    whereby the internal and external cones, which are complementary with respect to one another, have in pairs an axial shift causing during the tensioning operation the pulling of the fitting plug into the fitting bore and a mutual pressing of the annular surfaces against one another, and
    whereby one of the retainers is designed as a stop bolt fixed on the second component and the other retainer as a motion screw operable during the tensioning operation, wherein the internal and external cones, which are complementary to one another, have on the side of the stop bolt a smaller cone angle than on the side of the motion screw, and wherein the cone angles on the side of the stop bolt are 40° to 80° and on the side of the motion screw 70° to 120°.

2. The device according to claim 1, wherein the internal cones each end at a frustum side in an enlarged recess.

3. The device according to claim 1, wherein at least one of the internal threads, which is provided in the second component, is followed toward the fitting bore by a threadless guiding and supporting portion for the respective retainer designed as a screw.

4. The device according to claim 3, wherein the retainer designed as a screw engages with a threadless shaft section the guiding and supporting portion.

5. The device according to claim 1, wherein one of the retainers is designed as a head bolt, which has on its head side an internal or external cone, and which can be inserted from the inside of the fitting bore into the associated radial bore.

6. The device according to claim 5, wherein the head bolt with its shaft, which is designed threadless, and/or with its head part is pressed into the radial bore designed as a stepped bore.

7. The device according to claim 5, wherein the head bolt with its shaft having an external thread is screwed into the radial bore designed as a taphole.

8. The device according to claim 5, wherein the head bolt with an at least partially cylindrical or conical head part is force-lockingly supported on a wall portion of the radial bore, which wall portion is formed complementarily to said head portion.

9. The device according to claim 1, wherein the clamp bolt has at least one frustum-shaped internal cone, the base diameter of which is at least 65% of the guide surface's diameter.

10. The device according to claim 9, wherein the base diameter of the internal cone of the clamp bolt is 70 to 90% of the guide surface's diameter.

11. The device according to claim 9, wherein the height of the frustum-shaped internal cone is at a maximum 30% of the diameter of the guide surface.

12. The device according to claim 1, wherein the clamp bolt has a frustum-shaped external cone projecting beyond the axially facing end, the base diameter of which external cone is less than the diameter of the guide surface.

13. The device according to claim 12, wherein the base diameter of the external cone is at a maximum 85% of the diameter of the guide surface.

14. The device according to claim 12, wherein the height of the frustum-shaped external cone is at a maximum 40% of the diameter of the guide surface.

15. The device according to claim 1, wherein one of the two retainers has a frustum-shaped internal cone, the height of which is at a maximum 30% of the thread diameter.

16. The device according to claim 1, wherein one of the two retainers has a frustum-shaped internal cone, the base diameter of which is at least 70% of its external or thread diameter.

17. The device according to claim 1, wherein one of the two retainers has a frustum-shaped external cone, the height of which is at a maximum 40% of its outside or thread diameter.

18. The device according to claim 17, wherein the frustum diameter of the retainer designed as a motion screw is at least 40% of the outside or thread diameter.

19. The device according to claim 1, wherein the clamp bolt has a frustum-shaped external cone, which projects beyond the axially facing end and the frustum diameter of which corresponds to at least 0.4 times the associated base diameter.

20. The device according to claim 19, wherein the frustum diameter of the external cone formed on the clamp bolt corresponds to 0.6 to 0.9 times the associated base diameter.

21. The device according to claim 1, wherein the clamp bolt has at least one frustum-shaped internal cone arranged on the axially facing end, the frustum diameter of which internal cone corresponds at least to 0.5 times the associated base diameter.

22. The device according to claim 1, wherein one of the retainers designed as a stop screw has a frustum-shaped internal cone, the frustum diameter of which corresponds at least to 0.6 times the associated base diameter.

23. The device according to claim 1, wherein one of the retainers designed as a motion screw, has a frustum-shaped external cone, the frustum diameter of which corresponds at least to 0.4 times the associated base diameter.

* * * * *